(12) United States Patent
Horsley et al.

(10) Patent No.: US 10,911,602 B2
(45) Date of Patent: Feb. 2, 2021

(54) DATA COMMUNICATION

(71) Applicant: BRITISH TELECOMMUNICATIONS PUBLIC LIMITED COMPANY, London (GB)

(72) Inventors: Ian E Horsley, London (GB); Andrew D Wallace, London (GB); Trevor P Linney, London (GB)

(73) Assignee: BRITISH TELECOMMUNICATIONS public limited company, London (GB)

( * ) Notice: Subject to any disclaimer, the term of this patent is extended or adjusted under 35 U.S.C. 154(b) by 531 days.

(21) Appl. No.: 15/300,911

(22) PCT Filed: Mar. 30, 2015

(86) PCT No.: PCT/GB2015/050954
§ 371 (c)(1),
(2) Date: Sep. 30, 2016

(87) PCT Pub. No.: WO2015/150757
PCT Pub. Date: Oct. 8, 2015

(65) Prior Publication Data
US 2017/0026521 A1    Jan. 26, 2017

(30) Foreign Application Priority Data

Mar. 31, 2014  (EP) .................................... 14250066

(51) Int. Cl.
*H04M 11/06* (2006.01)
*H04L 5/14* (2006.01)
(Continued)

(52) U.S. Cl.
CPC ............ *H04M 11/062* (2013.01); *H04B 3/32* (2013.01); *H04B 3/48* (2013.01); *H04L 5/14* (2013.01)

(58) Field of Classification Search
CPC .. H04B 17/00; H04B 3/48; H04B 3/32; H04L 41/0631; H04L 41/0677; H04L 12/2898;
(Continued)

(56) References Cited

U.S. PATENT DOCUMENTS

| 2006/0095581 | A1 | 5/2006 | Ali et al. | |
|---|---|---|---|---|
| 2014/0086295 | A1* | 3/2014 | Cunningham | ...... H04L 41/0631 375/227 |
| 2016/0028434 | A1* | 1/2016 | Kerpez | .................... H04B 3/32 379/406.02 |

FOREIGN PATENT DOCUMENTS

| WO | WO 03/043213 | 5/2003 |
|---|---|---|
| WO | WO 2010/093300 | 8/2010 |

OTHER PUBLICATIONS

Van Der Putten, "Alcatel-Lucent Bell" NV Belgium, G.vdsl: Issues List for G.vdsl project; TD1111-U11R2, ITU-T-Draft; Study Period 2009-2012, International telecommunication Union, Geneva, vol. 4, No. 15, May 6, 2011 (26 pages).

(Continued)

*Primary Examiner* — Jung Liu
(74) *Attorney, Agent, or Firm* — Nixon & Vanderhye P.C.

(57) ABSTRACT

A method for selection of a digital subscriber line (DSL) technology for use by a first DSL transceiver in transferring data over a communications line between the first DSL transceiver and a second DSL transceiver. For the selection, an indication of attenuation in the communications line between the DSL transceivers is obtained and a DSL technology for use by the first DSL transceiver is selected from a plurality of DSL technologies supported by the first DSL transceiver. Selection of the DSL technology is determined on the basis of the indication of attenuation. Optionally, selection of the DSL technology may, in addition, be based on other parameters comprising an indication of the power spectral density mask limiting the power output onto the line (Continued)

by the DSL transceiver; an indication of the noise environment of the communications line; an indication of the highest discrete multitone modulation tone transmitted by the first DSL transceiver over the communications line.

15 Claims, 7 Drawing Sheets

(51) Int. Cl.
*H04B 3/32* (2006.01)
*H04B 3/48* (2015.01)

(58) Field of Classification Search
CPC ........ H04L 2012/6478; H04M 3/2209; H04M 11/062; H04M 3/085; H04M 3/304; H04M 3/306; H04M 2201/12
See application file for complete search history.

(56) References Cited

OTHER PUBLICATIONS

"Specification of the Access Network Frequency Plan Applicable to Transmission Systems Connected to the BT Access Network", Issue 5, NICC Standards Limited, Michael Faraday House, NICC ND 1602 V5.1.1, Sep. 2011 (42 pages).

International Telecommunication Union, ITU-T Telecommunication Standardization Sector of ITU, G.993.2, Series G: Transmission Systems and Media, Digital Systems and Networks, Digital sections and digital line system—Access Networks, Very High Speed Digital Subscriber Line Transceivers 2 (VDSL2) Dec. 2011 (376 pages).

International Telecommunication Union, ITU-T Telecommunication Standardization Sector of ITU, G.997.1, Series G: Transmission Systems and Media, Digital Systems and Networks, Digital sections and digital line system—Access Networks "Physical Layer Management for Digital Subscriber Line Transceivers" Jun. 2012 (150 pages).

European Search Report dated Sep. 24, 2014 issued in EP No. 14 25 0066 (4 pages).

International Preliminary Examination Report, issued in PCT/GB2015/050954 dated Oct. 13, 2016 (8 pages).

International Search Report for PCT/GB2015/050954 dated Jun. 18, 2015, 3 pages.

\* cited by examiner

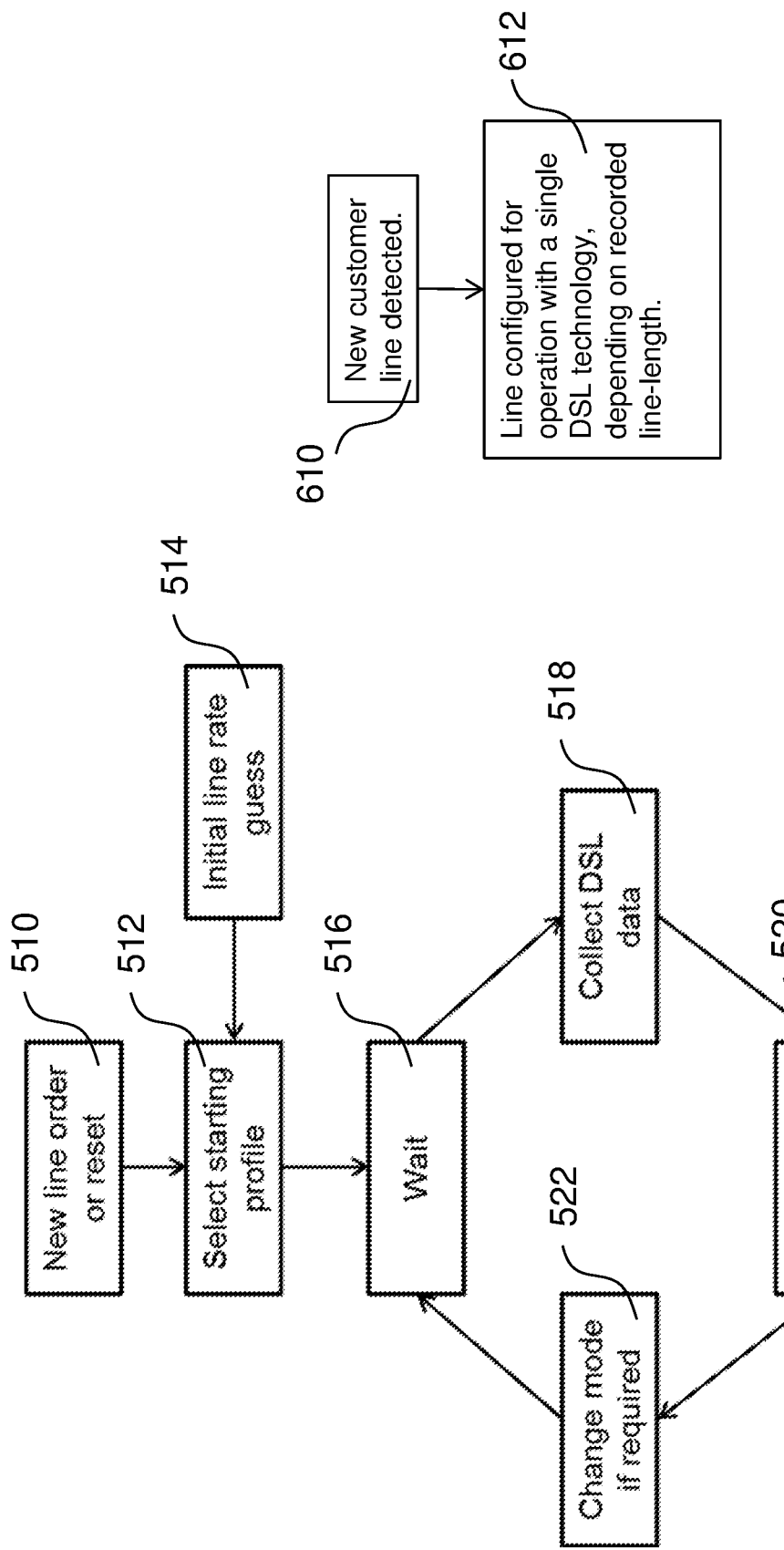

DATA COMMUNICATION

This application is the U.S. national phase of International Application No. PCT/GB2015/050954 filed 30 Mar. 2015 which designated the U.S. and claims priority to EP 14250066.9 filed 31 Mar. 2014, the entire contents of each of which are hereby incorporated by reference.

FIELD OF INVENTION

The present invention relates to data communication. In particular, it relates to configuration of digital subscriber line (DSL) equipment in access networks.

INTRODUCTION

Digital subscriber line (DSL) technology is designed to provide digital communication over twisted copper pair subscriber lines. The term DSL is a collective term to cover a number of variations on DSL technology, comprising G.Fast, ADSL, ADSL2, ADSL2+, SDSL, VDSL and VDSL2 (including associated annexes) among others, many of which use discrete multitone modulation (DMT). With DMT, transmit data is distributed over a number of channels, each channel modulating a different small-bandwidth carrier, also known as a "tone". A DSL connection comprises a copper subscriber line extending between two DSL transceivers, each comprising a DSL modem. A first DSL transceiver is typically located at the customer's premises, and the second transceiver may be located at the local exchange (known as the 'central office' in US terminology), a street cabinet, or distribution point (sometimes known as 'drop point'). Typically, the local exchange, street cabinet or distribution point includes a DSLAM (a form of aggregation transceiver device) comprising several DSL transceivers (one for each subscriber line). The DSLAM connects the first DSL transceiver at the customer's premises to the service provider's core network, typically over a faster optical fiber connection, and to a network management system.

The data rate obtainable using a DSL technology varies with line length and attenuation (see, for example, FIGS. 3a and 3b). The highest data rate may be provided by different DSL technologies at different line lengths. For example, the VDSL2 standard is designed for good performance on short lines (less than 1 kilometer) and some implementations of VDSL2 perform poorly on lines longer than this. Line interfaces in VDSL2 DSLAMs are often capable of using other DSL technologies, for example ADSL2+ (sometimes written ADSL2plus). Use of VDSL2 technology will normally provide a superior performance to ADSL2+ DSL technology over short lines. However, use of ADSL2+ technology can increase the data rate on long lines and can increase reach over VDSL2. Customer experience can be improved by enabling an appropriate DSL technology for the length of line.

Conventionally, DSL technology for a line is selected at the time of ordering equipment—i.e. by ordering customer premises (CPE) and DSLAM DSL transceivers configured to support the desired DSL technology. Selection of the DSLAM DSL transceiver mode of operation is commonly based on historical line performance data, however, such data are not particularly reliable. Such fixed product selection can't take account of real world performance data, requires increased complexity in customer equipment ordering systems and can't adapt to changing line conditions Some DSLAMs may be programmed to select between alternative DSL technologies, however, this approach has serious drawbacks. It may not achieve optimum performance and may result in unexpected behavior. In a multi-vendor environment, inter-operability can be adversely affected due to different DSLAM vendors using different algorithms to select a DSL technology. Training can be very slow where a DSLAM tries to train in multiple DSL technologies before deciding on which to use (and then trains in that DSL technology): the initialization time is significantly increased to the detriment of all lines served by that DSLAM. A DSLAM may fail to select ADSL2+ where VDSL2 is able to carry any data, even though ADSL2+ performs better. Selection of DSL technology at the DSLAM is outside the control of the network operator.

STATEMENT OF INVENTION

An automated method is provided to select, based on DSL performance data, between DSL technologies for operation of DSL transceivers connected in a communications network. In particular, the invention has application to determining DSL technologies for use at a DSL access multiplexer (DSLAM).

In a first aspect, the invention provides a method for selection of a digital subscriber line technology for use by a first DSL transceiver in transferring data over a communications line between the first DSL transceiver and a second DSL transceiver. An indication of attenuation in the communications line between the DSL transceivers is obtained. Selection of the DSL technology is determined on the basis of the indication of attenuation and a DSL technology for use by the first DSL transceiver is selected from a plurality of DSL technologies supported by the first DSL transceiver. Optionally, selection of the DSL technology may, in addition, be based on other parameters comprising an indication of a power spectral density mask limiting the power output by the DSL transceiver onto the line; an indication of the noise environment of the communications line; and an indication of the highest discrete multitone modulation tone transmitted by the first DSL transceiver over the communications line.

In a second aspect, the invention also provides a digital subscriber line controller for controlling configuration of a first DSL transceiver so as to control selection, from a plurality of DSL technologies supported by the first DSL transceiver, of a DSL technology for use by the first DSL transceiver in transferring data over a communications line between the first DSL transceiver and a second DSL transceiver. The DSL controller comprises: a line interface for obtaining an indication of attenuation over the communications line between the DSL transceivers; a processor for selecting from the plurality of DSL technologies a DSL technology for transfer of data between the DSL transceivers. Selection of the DSL technology is determined on the basis of one or more parameters, in which the one or more parameters comprise the indication of attenuation over the communications line between the DSL transceivers.

BRIEF DESCRIPTION OF THE DRAWINGS

Embodiments of the invention will now be described, by way of example, with reference to the accompanying drawings in which:

FIGS. 5 and 6a, 6b show flow charts representing aspects of the invention;

DETAILED DESCRIPTION

The method described here bases the choice of DSL technology on up-to-date measured values for loss on the line between DSLAM and CPE rather than on previously-recorded data. Use of the new method is expected to increase the accuracy of DSL technology selection in many cases. Line records often contain errors and can deviate significantly from the measured values. Optimizing DSL technology selection by use of the new method should increase the average bit rates available to customers.

Figure 1:
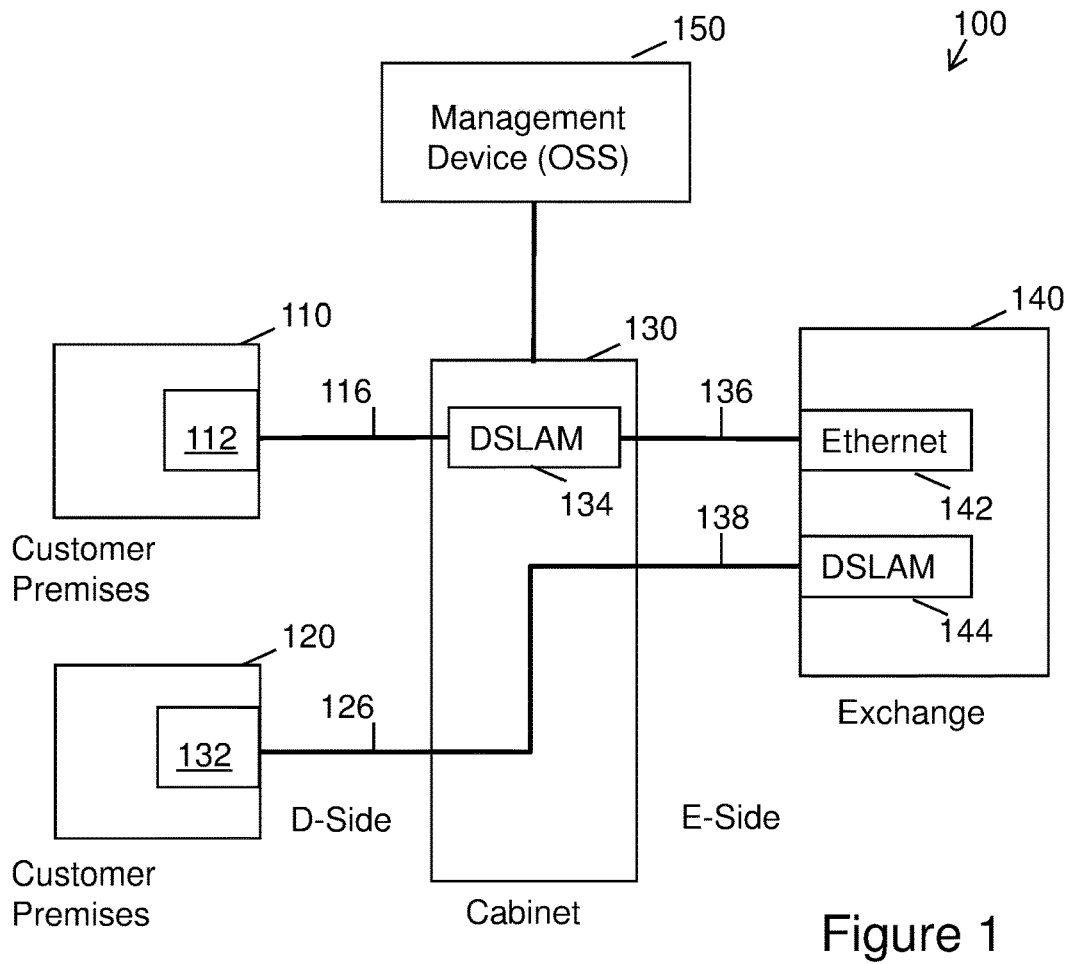
FIG. 1 shows a schematic block diagram of an access network.

FIG. 1 shows a schematic block diagram of a typical access network in which the invention may be implemented. Access network 100 comprises various customer premises 110, 120 connected to street cabinet 130 and exchange 140 by lines 116, 126, 136, 138. Customer premises 110, 120 comprise DSL transceivers 112, 132, such as are commonly provided by a domestic DSL router. Other customer premises equipment (CPE), such as computers and media players (not shown), can connect to one of DSL transceivers 112, 132 in order to communicate with remote data networks, such as the internet, using DSL technology. DSL communication is set up between each customer premise DSL transceiver 112, 132 and a DSLAM located either in street cabinet 130 or exchange 140. Communication between customer premises 120 and exchange 140 is solely by DSL, that is: communication between customer premises DSL transceiver 132 and exchange DSLAM 144 is by DSL over D-side copper pair 126 and DSL over E-side copper pair 138. Communication between customer premises 110 and exchange 140 is only partially by DSL, that is: communication between customer premises DSL transceiver 112 and cabinet DSLAM 134 is by DSL over D-side copper pair 116 but communication between cabinet DSLAM 134 and exchange Ethernet switch 142 is Ethernet over E-side optical fiber 136. Hence lines 116,126 and 138 are DSL over copper pair, while line 136 (between DSLAM 134 and exchange 140) is optical fiber. Cabinet DSLAM 134 is connected to local exchange 140 for interconnection to other operators via Ethernet Switch 142. Operation of cabinet DSLAM 134 is managed by management device 150, part of the network provider's operations support service (OSS). Management device 150 may comprise a server computer comprising a processor for executing and memory for storing appropriate software components, such as those shown in FIG. 2 and described next.

Figure 2:
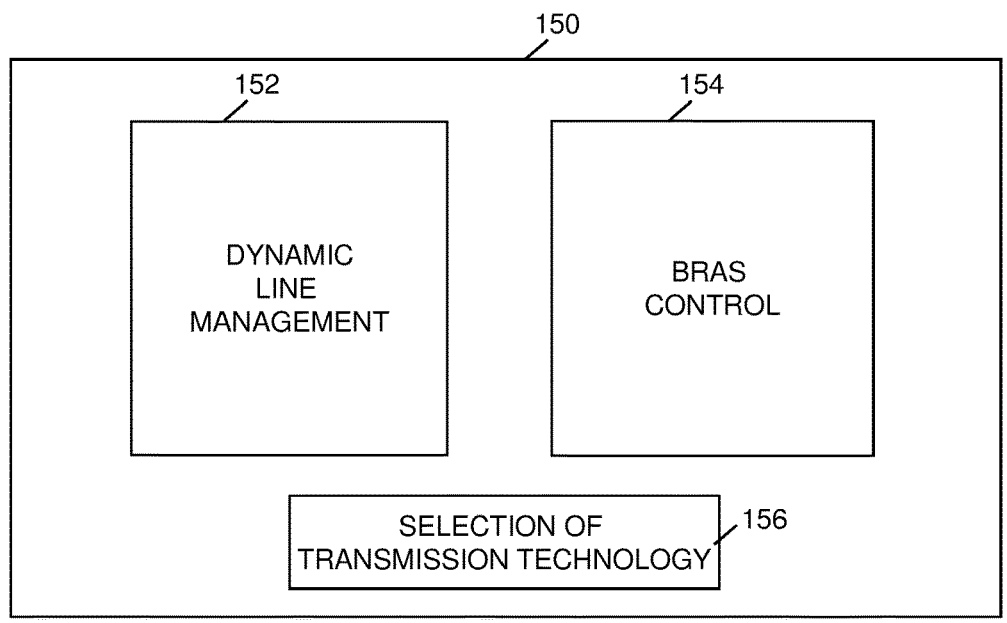
FIG. 2 shows a schematic block diagram of a management device in the network of FIG. 1.

As shown in FIG. 2, network management device 150 comprises three main functional OSS components. These include a BRAS provisioning or BRAS control function 154, a dynamic line management (DLM) function 152 and a new function: selection of transmission technology 156 The BRAS control function 154 processes part of the information received from the DSLAMs to assess a consistent connection speed achieved by each DSL transceiver. If it determines that this consistent speed has increased as a result of recent higher rate connections, it allows higher through flows of traffic for that DSL transceiver. On the other hand, if it detects that a particular connection speed is below the stored consistent value, it reduces the consistent value to the current connection speed and controls the traffic to the DSL transceiver to prevent the traffic flow exceeding what the DSL transceiver is currently able to cope with.

Dynamic line management (DLM) and dynamic spectrum management (DSM) are techniques for improving operation of DSL technology over a DSL line. Both DSM and DLM work by assessing the DSL transmission performance over the line and adjusting sets of parameters (also known as profiles) to improve the performance of whatever DSL technology is currently being used on the line. However neither DLM nor DSM typically select between different DSL technologies for the line. The profiles control operation of the DSLAMs in the network and determine how the DSL technology currently in use on the line is implemented by the DSLAM's DSL transceivers. The profiles control implementation of the current DSL technology based on assessment of the performance of the line. These profiles are maintained by the network operator providing DSL access service. DLM applies one of a finite number of profiles to each DSL transceiver with the aim of improving stability of operation of the DSL technology currently being used on the line, although this can result in a reduction in the synchronization rate.

Figure 3A:
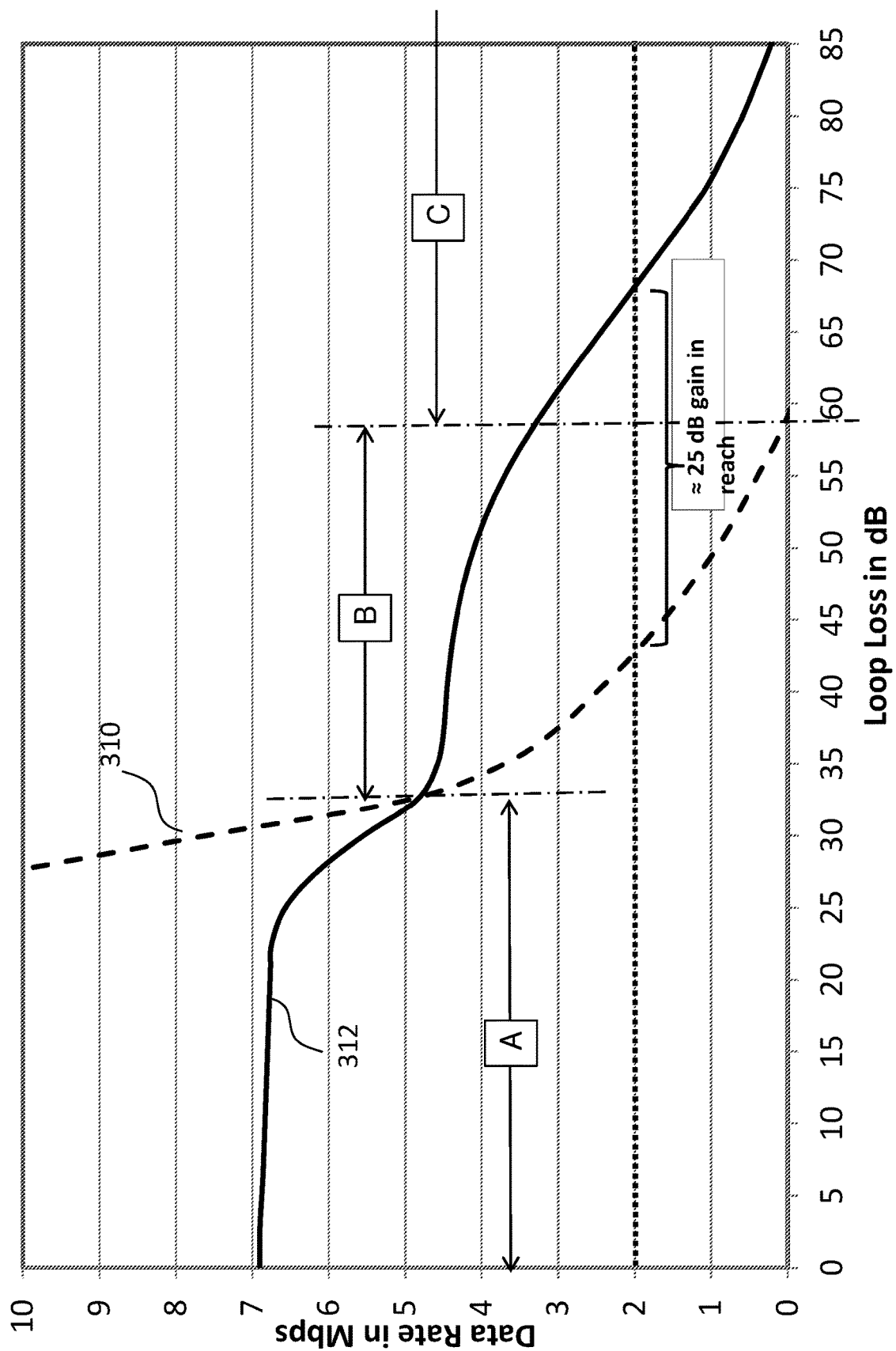
FIGS. 3a and 3b show characteristics of different DSL technologies.
Figure 3B:
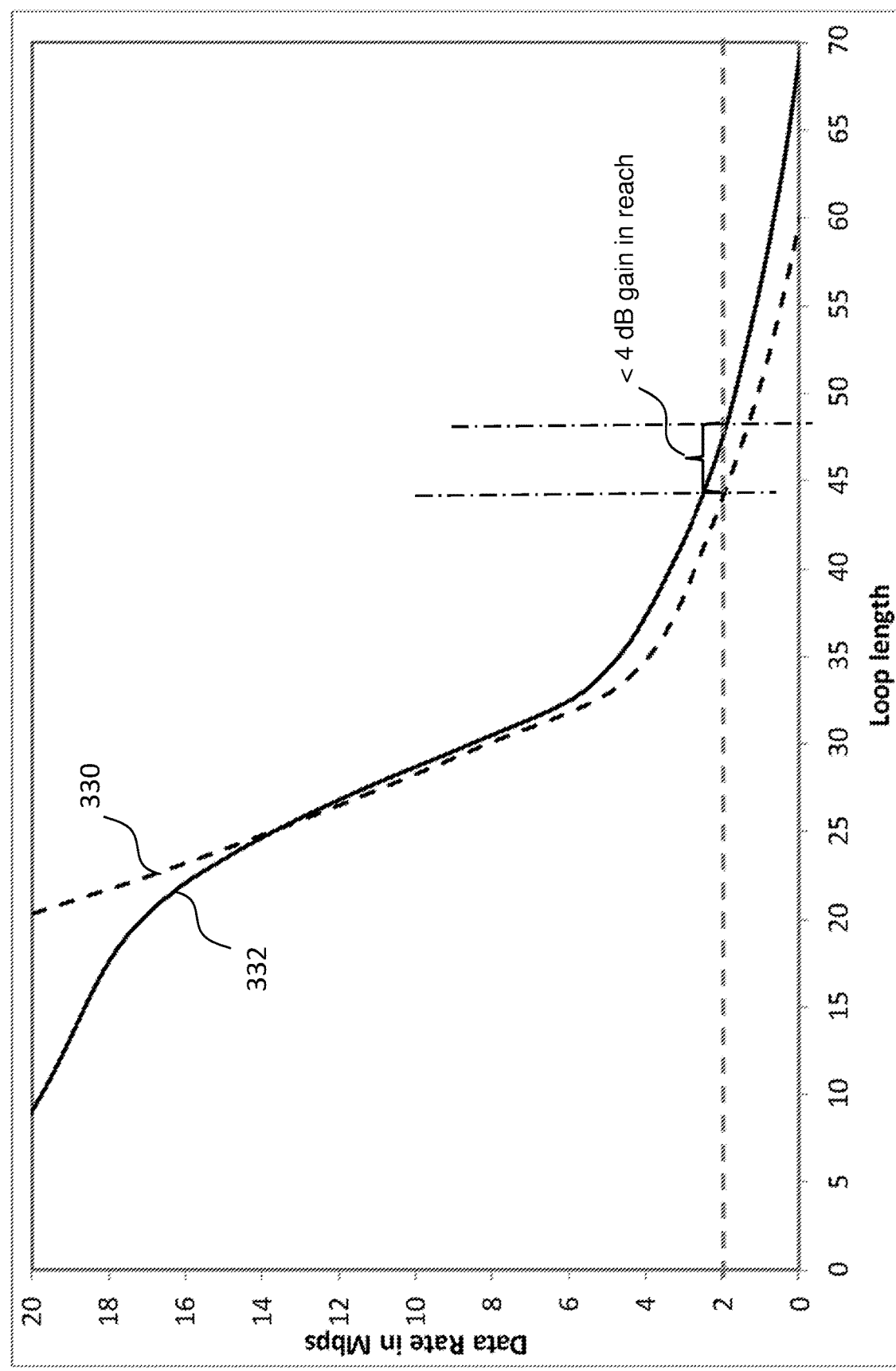

FIGS. 3a and 3b illustrate the potential benefit of selecting between different DSL technologies. FIGS. 3a and 3b show downstream data rate in Mbit/s plotted against loop loss in dB (which is generally taken as an indication of line length) at 300 kHz. In FIG. 3a, the performance of VDSL2 technology, shown by broken curve 310, is compared with the performance of ADSL2 Annex L technology, shown by solid curve 312. The differences between the curves 310 and 312 of FIG. 3a show the potential benefit of ADSL2 Annex L at higher values of attenuation (loop loss). For example, at the key data rate of 2 Mbps, ADSL2 Annex L is able to provide service at an extra 25 dB attenuation (loop loss) indicating a much longer line length. However, VDSL2 provides superior performance at lower values of attenuation (loop loss)—see region A in FIG. 3a.

The comparison with VDSL2 falls into 3 distinct regions separated by (i) a cross-over between 30 and 35 dB loop loss, where VDSL2 data rate curve 310 drops below ADSL2+ data rate curve 312 and (ii) between 60 and 65 dB loop loss where VDSL2 data rate indicated by curve 310 drops below zero data rate. The three regions are:

A. short (low loss) lines from 0 up to around 32 dB, where VDSL2 performs better than other DSL technologies;
B. medium length (loss) lines between 32 and 60 dB, where VDSL2 still works but other DSL technologies give better data rates;
C. long (high loss) lines above 60 dB, where VDSL2 provides no service (i.e. zero data rate) but other DSL technologies do provide service.

In FIG. 3b the performance of VDSL2 technology, shown by broken curve 330, is compared with the performance of ADSL2+ technology, shown by solid curve 332. The differences between the curves 330 and 332 of FIG. 3b show the potential benefit of ADSL2+ at higher values of attenuation (loop loss). At above around 25.5 dB, ADSL2+ provides higher data rates than VDSL2. VDSL2 data rate falls below 2 Mbps at around 44 dB, while ADSL2+ data rate is greater than 2 Mbps up to around 47.5 dB. At the key data rate of 2 Mbps, ADSL2+ is able to provide service at nearly 4 dB greater attenuation (loop loss) indicating a longer line length. Similar behavior can be shown for other ADSL technologies.

According to a first embodiment, the operator's OSS is configured to instruct downstream systems (including DSLAMs) embodying one or more DSL transceiver to use a specific DSL technology (e.g. G.Fast, VDSL2, ADSL, ADSL2, ADSL2+ and others). To implement the first embodiment in the access network, an automated DSL technology selection algorithm 156 (FIG. 2) is added around existing DLM (dynamic line management) algorithm 152 OSS component. The DLM algorithm currently processes performance data and applies profile changes to manage line stability of whatever DSL technology is currently in use on the line but does not control selection of DSL technology. The new algorithm selects an initial profile (i.e. configuration data that determine operation of a DSL transceiver) to determine a DSL technology to be applied to the lines by downstream systems (including DSLAMs) on deployment and after power-up or a reset, and monitors all lines on a regular basis: instructing the downstream systems to switch between DSL technologies as required to achieve optimum performance. The different profiles (i.e. the range of DSL technologies) available to the new algorithm may be different for different lines.

Algorithm 156 according to a first embodiment will be described in general terms by way of example for a DSLAM with reference to FIG. 5. Algorithm 156 starts at event 510 which corresponds to installation, power-up or reset of a DSLAM. Event 510 may optionally be followed at 512 by selection of an initial or starting profile to bring the DSLAM into operation with minimum delay. Selection of an initial or starting profile may be based on an initial estimate of the line conditions, for example based on historic line characteristic data 514. Alternatively, selection of an initial or starting profile may be skipped and event 510 followed directly by event 516.

In order to avoid rapid changes in profile, which may adversely affect performance, once the initial profile has been implemented (i.e. once the DSLAM is functional to exchange DSL data on the communications line) algorithm 156 may optionally move to wait state 516. Algorithm 156 then enters a cycle 516, 518, 520, 522), which may occur once every 24 hours according to a preferred embodiment. During the cycle it is decided whether to change the profile or leave it the same. After an appropriate delay, for example 24 hours, process 500 moves from wait state 516 to data-collection state 518, in which data on performance of the DSL line is collected. The data on performance of the DSL line is collected from DSLAM 134 where it is measured using well-known techniques and will typically comprise the measure of attenuation, known as H log, although other parameters, including but not limited to attenuation measures such as LATN and KL0, may be used.

Once the data on performance of the DSL line is collected, a routine is executed at 520 to determine, on the basis of the DSL line performance data, whether the current settings for operation of the DSL transceiver are optimum or whether improved performance may be achieved by reconfiguring the DSL transceiver to use a different DSL technology. Where no change of DSL technology operated by the DSL transceiver is selected, the algorithm returns to wait state 516 and a further delay period is initiated. Where a change of DSL technology operated by the DSLAM is selected, this is implemented at 522, e.g. by changing DSLAM profile. Following implementation of the change of DSL technology, the algorithm returns to wait state 516 and a further delay period is initiated.

Aspects of the algorithm of FIG. 5 will now be described in more detail, with reference to FIGS. 6a and 6b.

Select starting profile.

An embodiment of the routine implemented at 510-512 in the algorithm of FIG. 5 will now be described in more detail by way of example, with reference to FIG. 6a. At 610 a customer line is detected, e.g. as a result of a customer line being manually connected to a DSL transceiver on a DSLAM or as a result of the power up or reset of a DSLAM. At 612 the new line is optionally configured for operation with a single DSL technology, depending on records of line-length (e.g. VDSL2 for shorter lines and ADSL2+ only where recorded length indicates VDSL2 would not be able to train). In order to select an initial or starting profile for the DSLAM, an estimate of an achievable line rate (initial_rate_estimate) for each line connected to the DSLAM is made based on historical information relating to the line, Although this may not give the benefit of algorithm 156 of achieving optimum performance, it allows for fast start-up of DSL communication on the line. The historical information may comprise records of cable plant, cabinet assigned loss (CAL) and routing data. Routing data is recorded information on a line and contains data on the cable used, the cable route and the cable size. In this context, the records of cable plant may typically be a record of physical extent, route and junctions along a line between two points, such as between the exchange and a cabinet or between a cabinet and a customer's premise.

Thresholds

When an OSS system management component requests an initial profile for a line, the OSS DLM component compares the estimated line length (initial_length_estimate) against a threshold value (initial_length_estimate_threshold). The OSS DLM component chooses a starting profile for operation of the DSL transceiver using either VDSL2 or ADSL2+ technology, depending whether the estimated line rate is greater or less than the estimated line length threshold. The chosen profile is returned to the OSS for application to the network and is stored by the OSS as the starting profile for future DLM analyses. The DLM algorithm has access to the stored profile and can retrieve the settings, including selected DSL technology, for that line.

As indicated above, alternatively selection of an initial or starting profile may be skipped and event 510 followed directly by event 516.

An embodiment of the algorithm implemented at 518-522 in the process of FIG. 5 will now be described in more detail by way of example, with reference to FIG. 6b. On leaving the wait state 634 (equivalent to 516 of FIG. 5), DSL performance parameters (e.g. H log) for the line are collected at 620 from the DSLAM. Taking the example of H log, at 622, H log vector data is converted to single attenuation value using method given in ITU G.993.2 section 7.2.1.3.2.1.2 or better.

Figure 4:
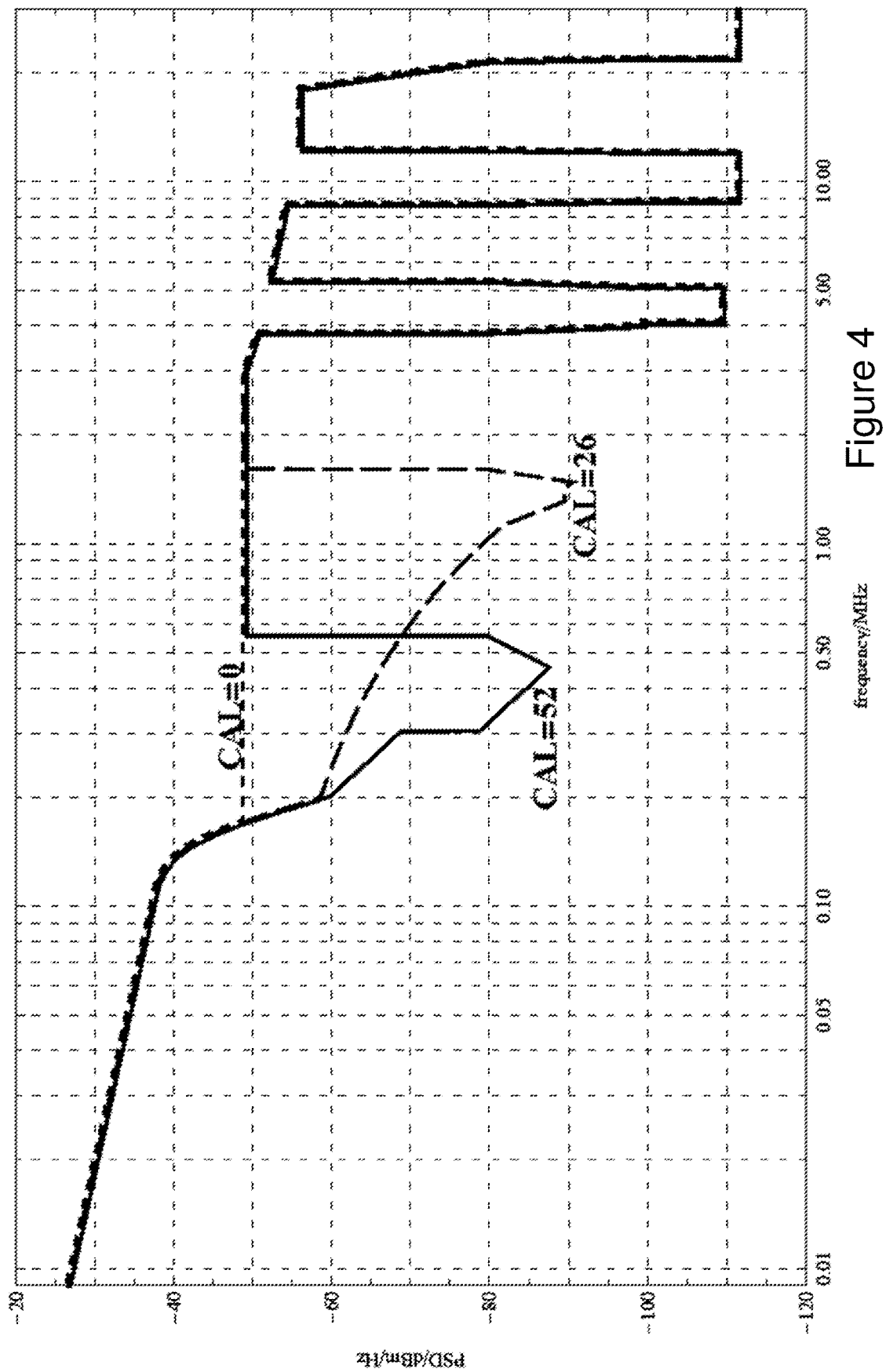
FIG. 4 shows representative PSD masks.
Figure 6B:
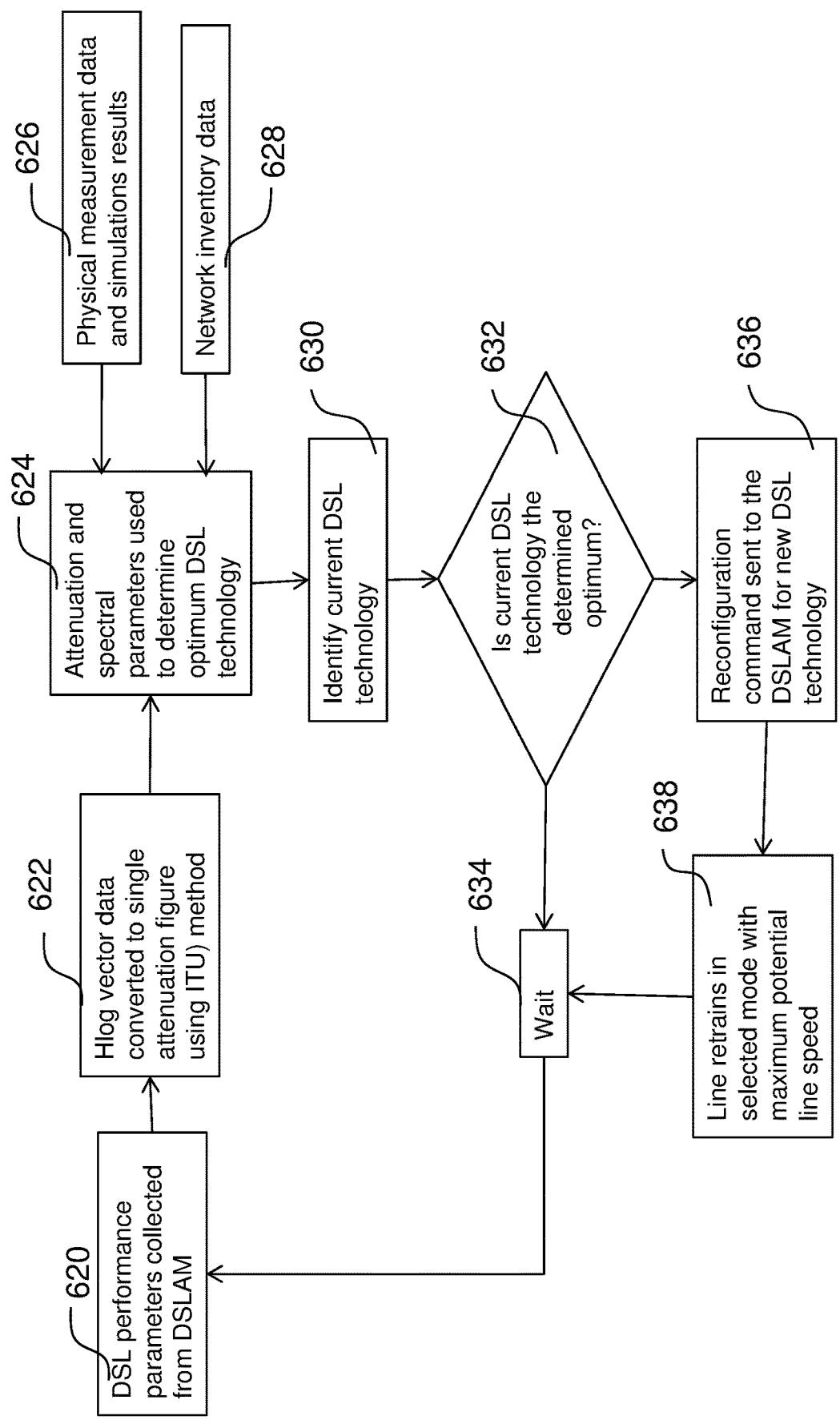

Before proceeding with description of FIG. 6b, it may be helpful briefly to discuss PSD masks. Each line may have a spectral mask (power level versus frequency) limit assigned to protect other lines. It is well-known that transmissions on one subscriber line may cause interference on another subscriber line. This is known as 'crosstalk'. Furthermore, it is common for customers' DSL lines to be bundled together (for example, a copper pair line between a customer's DSL transceiver and the local exchange may be bundled together with a copper pair line between another customer's DSL transceiver and the cabinet, as shown in FIG. 1). Copper pair lines between exchange DSLAMs and their customers' DSL transceivers tend to be significantly longer than copper pair lines for cabinet DSLAMs, and a signal on the longer copper pair line may be significantly attenuated by the point at which it is bundled together with the copper pair lines for other DSLAMs. Thus, full power transmissions by cabinet DSLAMs cause high levels of crosstalk on the exchange DSLAM copper pair lines. In the UK, for signals transmitted from the cabinet (e.g. by the DSLAM), this power spectral density (PSD) mask is controlled by a value called CAL (cabinet assigned loss) as defined by Access Network Frequency Plan (ANFP) part B. The spectral mask can affect the relative performance of VDSL2 and ADSL2+ at different losses. As a result the loss thresholds for switching between DSL technologies will vary depending on the spectral mask assigned to the line. This may be in the form of a look up table of the thresholds given the spectral mask. Some typical PSD masks are shown in FIG. 4. From FIG. 4, we see the value of CAL affects PSD in a central frequency range between around 0.2 and 2 MHz. The higher the value of CAL, the more restrictive the PSD mask, so for CAL of zero, the mask is largely flat in this central region but as CAL increases the mask dips lower.

At 624, the acquired and suitably processed performance parameters are used to determine (e.g. via look-up table) the optimum DSL technology for the line. The determination of optimum DSL technology may use physical measurement data and simulation results data 626 to determine optimum DSL technology for each combination of line attenuation and PSD mask. The determination of PSD mask for the line is derived from network inventory data 628 used to determine the spectral limits that set the spectral mask. Alternatively, determination of optimum DSL technology may use input from other data or systems that set spectral masks. At 630 the DSL technology currently in use on the line (e.g. G.Fast, VDSL2 or ADSL2+) is identified from the current line profile stored at the OSS and is compared at 632 with the DSL technology determined at 624 to be optimum. If the technology currently in use on the line is found to be optimum, no further action is required in this cycle and the algorithm proceeds to wait state 634 until the next cycle. If the technology currently in use on the line is not found to be optimum, a reconfiguration command is sent (636) to enable an appropriate DSLAM profile to reconfigure the DSL transceiver to use the selected DSL technology (i.e. G.Fast, VDSL2 or ADSL2+). The DSLAM is inhibited from deciding itself to change the DSL technology. Finally, at 638 the DSL transceiver retrains in the selected DSL technology with highest predicted maximum downstream line speed and the algorithm returns to wait state 634.

According to a further embodiment, the new algorithm implements the selection of DSL technology in a network management layer and, hence, through an order management system rather than a product management layer. Implementation in the network management layer means that fewer systems are affected, obviates changing interfaces to content providers and obviates the content providers making a technology-related selection for each line.

KL0/LATN

According to further embodiments, the standard data collection process that aggregates data daily for the DLM algorithm may be modified to improve performance by including extra data on DSL performance from each line, for example, line attenuation measures LAIN or KL0 (as defined in G.997.1, sections 7.5.1.9/7.5.1.10 and 7.5.1.23) These attenuation measures may be used in place of or in addition to H log.

A value for KL0 may be determined using the formula:

$KL0=\text{MIN}(\text{loss}(f)/\text{sqrt}(f))$

A further method uses:

$KL0=\text{Percentile}(\text{loss}(f)/\text{sqrt}(f), \text{percent})$

For example where, percent=0.9, and where the function Percentile({x},y) returns the maximum value w in set {x} such that the number of elements in {x} with value less than w is less than y percent of the total number of elements in {x}. This can be further improved by excluding parts of the frequency range where the received power (transmit power—loss) drops below a threshold.

The following process is then performed for each line every cycle.

The DSL technology current in use on the line (e.g. G.Fast, VDSL2 or ADSL2+) is identified from the current line profile stored at the OSS. If VDSL2 is being used, the value of line attenuation measure KL0 in the collected data is compared against a threshold (VDSL2_to_ADSL2+_threshold) for the PSD mask assigned to that line. If KL0 is greater than VDSL2_to_ADSL2+_threshold, then the DSL technology is switched to ADSL2+. If ADSL2+ is being used, the value of line attenuation measure LATN in the collected data is compared against a threshold (ADSL2+_to_VDSL2_threshold) for the PSD mask assigned to that line. If LATN is less than ADSL2+_to_VDSL2_threshold then the DSL technology is switched to VDSL2.

Thresholds VDSL2_to_ADSL2+_threshold and ADSL2+_to_VDSL2_threshold are set with enough separation to avoid a line oscillating backwards and forwards between DSL technologies in the presence of normal variations in the data reported from the line. The aim in setting up this hysteresis is to allow the DSL technology to switch in response to large changes in attenuation (for example, due to the customer's line being switched to a different cable) but not to respond to small variations in the reported data.

Noise

An indication of the noise environment of the communications line between the DSL transceivers may be used for selecting between DSL technologies. The noise environment of the communications line between the DSL transceivers may be derived from the downstream quiet line noise (QLN) PSD parameter QLN(f) (QLNpsds), as defined in G.997.1 at section 7.5.1.27.3. This parameter is an array of real values in dBm/Hz for downstream QLN(f). Each array entry represents the value of QLN for a particular subcarrier group.

The data rate of a VDSL2 connection drops for lines with a line attenuation significantly above 30 dB; whereas ADSL2 or ADSL2+ can give much better rate in this high noise margin region. VDSL2 will tend to be selected for short loops and ADSL2 or ADSL2+ will tend to be selected for long loops. However, for medium-length loops, selection of DSL technology depends on the noise environment, so that ADSL2 or ADSL2+ will tend to be selected for noisier loops. The noise level at which ADSL2 or ADSL2+ becomes preferable to VDSL2 will vary with loop length, with longer lines requiring less noise to render ADSL2 or ADSL2+ preferable.

Quiet Line Noise (QLN) is a measurement of the noise received at the receivers in a DSL system and is taken each time the DSL transceiver trains up. An example specification of QLN can be found in G.993.2 12/11, section 11.4.1.1.2. According to a further embodiment, where QLN data is available through data collection the new algorithm may be further improved. Depending on the noise environment the point where ADSL2+ performs better than VDSL2 may shift. The average positive difference (as defined below) between the measured values of QLN (either last recorded, maximum or average over a time period) and a reference noise profile may be calculated and compared against a different threshold for each KL0 or LATN measurement. According to this embodiment, the choice of DSL technology depends on the line length and the noise environment.

Average Positive Difference (APD) between QLN and reference may be derived as follows. For each quantized loop loss (KL0 or LATN) a prediction of the crosstalk noise shape (NS) is made (at a low level of coupling). For each line, the noise shape is selected from KL0 or LATN. For each DMT tone, the value: max(QLN−NS, 0) is calculated. The average of three of these values is taken and rounded to nearest 2 dB, or so, to arrive at the value for APD. For each APD there may be a different threshold for switching between ADSL2+ and VDSL2

A number of additional embodiments are proposed that use different criteria for selecting between DSL technologies and these may be used singly or in combination and either in combination with or in place of those described above. For example, rather than using LATN and KL0 values, a maximum attainable data rate value could be used together with appropriate thresholds. Rather than data rate, bit allocation per tone value may be used. A bit allocation table datum (defined in G.997.1 section 7.5.1.29.1) is a vector that contains a record of the number of bits (between 0 and 15) that are allocated to each tone used by a DSL technology. According to this embodiment, entries in a range of the bit allocation table (i.e. covering tones between two selected frequencies) are averaged and compared to a pair or thresholds. The frequency range when using VDSL2 and changing to ADSL2+ would be different from the frequency range when for moving in the opposite sense and is set to avoid oscillation between different DSL technologies. An indication of a value for the highest DMT frequency or tone transmitted over the communications line between the DSL transceivers may be used for selecting between DSL technologies. The highest DMT tone used in a modulation scheme for transferring data on the communications line between the DSLAM and the CPE DSL transceivers may be derived from the downstream bits allocation (BITSpsds) parameter defined in G.997.1 at section 7.5.1.29.1. This parameter defines downstream (i.e. towards the customer premises) bits allocation table per subcarrier. It is an array of integer values in the 0 to 15 range for subcarriers 0 to NSds. The highest subcarrier for which there is a non-zero entry in the table represents the highest frequency component in use in the modulation scheme. A signal to noise ratio (SNR) per tone value could be used in a similar way, where the highest tone with positive SNR is used rather than the highest subcarrier for which there is a non-zero entry According to these embodiments, the values are compared to a pair of different thresholds (i.e. a VDSL2_to_ADSL2+_threshold and an ADSL2_+_ to_VDSL2_threshold). A change from VDSL2 to ADSL2+ may be enacted when the value is less than the threshold (VDSL2_to_ADSL2+_threshold). A change from ADSL2+ to VDSL2 may be enacted when the value exceeds the threshold (ADSL2+_to_VDSL2_threshold).

All the above methods are improvements on product-based selection and on multimode DSLAMs. Product-based selection results in proliferation of product variants increasing the burden on the communications provider and is purely based on records data. The above methods more accurately select the best DSL technology to give higher data rates when compared to product based selection. DSLAMs in multimode either suffer long synchronization times or fail to select the best DSL technology and are prone to oscillating between DSL technologies. The above methods reduce synchronization times while providing more efficient and more reliable selection of the best DSL technology and avoiding oscillation between DSL technologies.

The above methods are not restricted to VDSL2 and ADSL2+ and are applicable to any system capable of operating with two different DSL technologies, where each DSL technology performs better at different line lengths and noise environments. The above methods are not restricted to selecting between two DSL technologies but can be applied to a system supporting three or more DSL technologies in which selection is carried out to identify the optimum DSL technology from among three or more.

Figure 7:
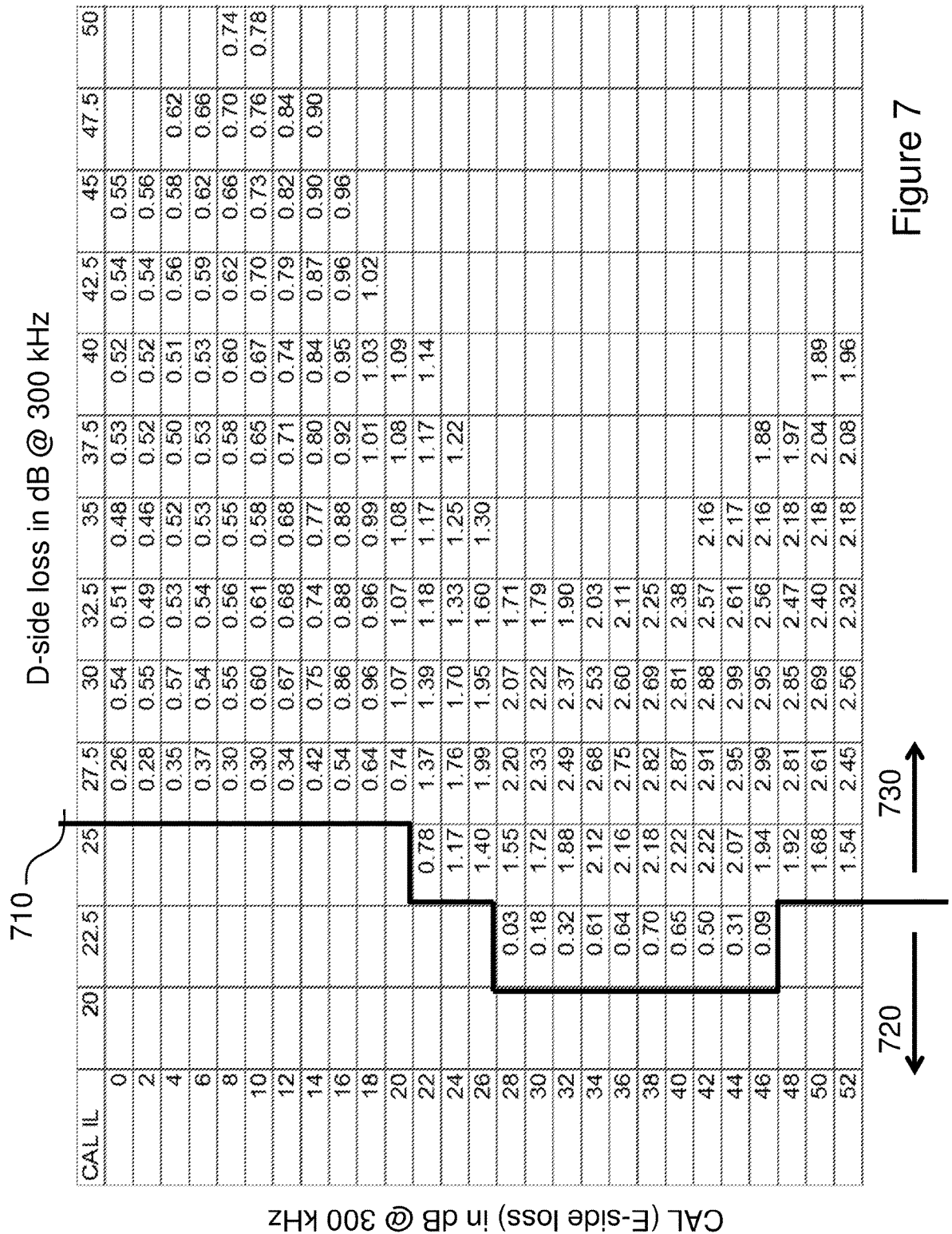
FIG. 7 illustrates improvements in data rates from switching between DSL technologies.

The above thresholds would need to be selected based on the operators, network, noise environment, DSLAMs, CPEs and other factors. FIG. 7 shows a table with D-side loss on the x-axis and CAL (E-side loss) on the y-axis both measured in dB @ 300 kHz. The table of FIG. 7 illustrates improvements in data rate experienced at various values of D-side loss and CAL as a result of intelligent selection of DSL technology. In FIG. 7, line 710 indicates the boundary between two regions of the D-side loss/CAL space. In the region 720 to the left of line 710 (i.e. generally relating to lower values of D-side loss), VDSL2 provides better data rates, however, changing to ADSL2+ in the region 730 to the right of line 710 results in higher data rates. The numerical values in region 730 indicate increases in data rate achieved by switching from VDSL2 to ADSL2+ technology. The data shown in FIG. 7 is based on real DSLAM and CPE equipment with simulated crosstalk and line plant, coupled with simulation data on real loop topology.

A similar solution could be deployed in a decentralized manner either on an EMS Element Management System controlling all the DSLAMs or other intermediate points such as a Persistent Management Agent

REFERENCES

G.997.1 Transmission Systems and Media, Digital Systems and Networks: digital sections and digital line system—Access Networks; ITU-T; June 2012.

Access Network Frequency Plan (ANFP); Issue 5, September 2011; NICC Standards Limited, Michael Faraday House, Six Hills Way, Stevenage SG1 2AY.

G.993.2 Transmission Systems and Media, Digital Systems and Networks—Digital sections and digital line system—Access networks; ITU-T; December 2011

G.992.3 Asymmetric digital subscriber line transceivers 2 (ADSL2); ITU-T; April 2009

G.992.5 Asymmetric digital subscriber line 2 transceivers (ADSL2)—Extended bandwidth ADSL2 (ADSL2plus); ITU-T; January 2009

The invention claimed is:

1. A method of selecting from a plurality of digital subscriber line (DSL) technologies supported by a first DSL transceiver, a DSL technology for use by the first DSL transceiver in transferring data over a communications line between the first DSL transceiver and a second DSL transceiver, the method comprising:
    obtaining an indication of attenuation in the communications line between the DSL transceivers;
    selecting from the plurality of DSL technologies, a DSL technology for use by the first DSL transceiver in transferring data over the communications line between the DSL transceivers;

in which selection of the DSL technology is determined on the basis of one or more parameters;

in which the one or more parameters comprise the indication of attenuation in the communications line between the DSL transceivers.

2. The method of claim 1 in which the power output onto the line by the first DSL transceiver is limited by a power spectral density mask, in which the method comprises obtaining an indication of the power spectral density mask;

in which the one or more parameters also comprise the indication of the power spectral density mask.

3. The method of claim 1 also comprising obtaining an indication of the noise environment of the communications line between the DSL transceivers; in which the one or more parameters also comprise the indication of the noise environment.

4. The method of claim 1, in which the noise environment of the communications line comprises an indication of noise impinging on the line.

5. The method of claim 1 also comprising obtaining an indication of the highest discrete multitone modulation (DMT) tone transmitted by the first DSL transceiver over the communications line between the DSL transceivers; in which the one or more parameters also comprise the indication of the highest frequency DMT tone.

6. The method of claim 1, in which the indication of attenuation is derived from at least one of H log, KL0, LATN and QLN.

7. The method of claim 1, in which the indication of attenuation is measured at the first DSL transceiver.

8. The method of claim 1 comprising reconfiguring the first DSL transceiver to switch from use of a first DSL technology to use of the DSL technology selected, on the basis of the one or more parameters, for transfer of data between the DSL transceivers.

9. The method of claim 8, in which the first DSL technology comprises one of G.Fast, VDSL2, ADSL, ADSL2 and ADSL2+.

10. The method of claim 1, in which the selected DSL technology comprises one of G.Fast, VDSL2, ADSL, ADSL2 and ADSL2+.

11. The method of claim 1, in which the DSL transceivers comprise a digital subscriber line access multiplexer modem and an end-user DSL modem.

12. A digital subscriber line (DSL) controller for controlling configuration of a first DSL transceiver so as to control selection, from a plurality of DSL technologies supported by the first DSL transceiver, of a DSL technology for use by the first DSL transceiver in transferring data over a communications line between the first DSL transceiver and a second DSL transceiver; in which the DSL controller comprises:

a line interface for obtaining an indication of attenuation over the communications line between the DSL transceivers;

a processor for selecting from the plurality of DSL technologies a DSL technology for transfer of data between the DSL transceivers;

in which selection of the DSL technology is determined on the basis of one or more parameters;

in which the one or more parameters comprise the indication of attenuation over the communications line between the DSL transceivers.

13. The DSL controller of claim 12, in which the power output onto the line by the first DSL transceiver is limited by a power spectral density mask;

in which the DSL controller comprises a processor for obtaining an indication of the power spectral density mask;

in which the one or more parameters also comprise the indication of the power spectral density mask.

14. The DSL controller of claim 12, also comprising a line monitor for obtaining an indication of the noise environment of the communications line between the DSL transceivers;

in which the one or more parameters also comprise the indication of the noise environment.

15. The DSL controller of claim 12 comprising a processor for reconfiguring the first DSL transceiver to switch from use of a first DSL technology to use of the DSL technology selected, on the basis of the one or more parameters, for transfer of data between the DSL transceivers.

* * * * *